(12) United States Patent
Andrade et al.

(10) Patent No.: US 10,777,068 B2
(45) Date of Patent: Sep. 15, 2020

(54) SYSTEM AND METHOD FOR DETECTING THE PRESENCE OF NON-SELF-SUFFICIENT OCCUPANTS AT THE BACK SEAT OF VEHICLES

(71) Applicant: FCA FIAT CHRYSLER AUTOMÓVEIS BRASIL LTDA., Betim (BR)

(72) Inventors: Lucas Almeida De Andrade, Betim (BR); Toshizaemom Noce, Betim (BR); Cid Araújo Soares, Betim (BR); Glaycon Alvim Tôrres, Betim (BR); Guilherme Basílio Soares Tentempo, Betim (BR); João Paulo Rodrigues, Betim (BR); Leonardo Ferreira Do Carmo Silva, Betim (BR)

(73) Assignee: FCA Fiat Chrysler Automóveis Brasil Ltda. (BR)

( * ) Notice: Subject to any disclaimer, the term of this patent is extended or adjusted under 35 U.S.C. 154(b) by 0 days.

(21) Appl. No.: 15/559,690

(22) PCT Filed: Jun. 15, 2015

(86) PCT No.: PCT/BR2015/050077
§ 371 (c)(1),
(2) Date: Sep. 19, 2017

(87) PCT Pub. No.: WO2016/149778
PCT Pub. Date: Sep. 29, 2016

(65) Prior Publication Data
US 2018/0253959 A1    Sep. 6, 2018

(30) Foreign Application Priority Data

Mar. 26, 2015   (BR) ............................ 102015006784

(51) Int. Cl.
*B60N 2/00* (2006.01)
*G08B 21/24* (2006.01)
(Continued)

(52) U.S. Cl.
CPC ............. *G08B 21/24* (2013.01); *B60N 2/002* (2013.01); *G08B 21/22* (2013.01); *B60Q 9/00* (2013.01)

(58) Field of Classification Search
CPC ......... G08B 21/22; G08B 21/24; B60Q 9/001
See application file for complete search history.

(56) References Cited

U.S. PATENT DOCUMENTS 4,638,174 A * 1/1987 Bier ..................... B60Q 9/001
                                                  307/10.1
5,250,945 A * 10/1993 Dombrowski ......... B60Q 9/008
                                                  340/433
(Continued)

FOREIGN PATENT DOCUMENTS

JP            2001030856 A       2/2001

*Primary Examiner* — Hai Phan
*Assistant Examiner* — Son M Tang
(74) *Attorney, Agent, or Firm* — Gloria Tsui-Yip, Esq.; Gottlieb, Rackman & Reisman, P.C.

(57) ABSTRACT

A system that is implemented in a vehicle (1) having front and rear doors (2) (3) with door opening sensors ($S_M$; $S_D$; $S_E$) and one indicative sensor (ST) of locked door. A processing unit (4) calculates, by measuring the time the door remains open and by the sequence and/or frequency of openings and closings the doors (2, 3), the possibility of a non-self-sufficient occupant have been forgotten inside; and controls the actuation of an alarm (A1, A2, AL) in the event of the calculation indicates the possibility of such occupant have been forgotten inside the vehicle. The system identifies the possibility of an occupant has been introduced inside the vehicle when the opening time of the rear door is longer than time T1, and identifies the possibility of an occupant has (Continued)

been forgotten in the vehicle by means of the information processing sent by the door sensors.

16 Claims, 2 Drawing Sheets

(51) Int. Cl.
*G08B 21/22* (2006.01)
*B60Q 9/00* (2006.01)

(56) References Cited

U.S. PATENT DOCUMENTS

| | | | | |
|---|---|---|---|---|
| 5,376,779 A * | 12/1994 | Tomotsune | ........ | G07C 9/00031 235/382 |
| 5,568,120 A * | 10/1996 | Lemense | ............ | B60R 25/1003 180/257 |
| 5,874,890 A * | 2/1999 | Mizutani | ................ | B60R 25/04 180/287 |
| 5,874,989 A * | 2/1999 | O'Brien | ................ | H04N 7/183 340/433 |
| 6,459,369 B1 * | 10/2002 | Wang | ................ | B60C 23/0401 116/34 R |
| 6,727,823 B2 | 4/2004 | Ando et al. | | |
| 6,922,147 B1 * | 7/2005 | Viksnins | ................ | B60N 2/002 340/573.1 |
| 7,079,016 B2 * | 7/2006 | Ho | ........................ | G08B 21/22 180/273 |
| 7,170,401 B1 * | 1/2007 | Cole | ...................... | B60N 2/002 340/439 |
| 7,218,211 B2 | 5/2007 | Ho et al. | | |
| 7,353,088 B2 * | 4/2008 | Eagen | ................ | B60R 25/1004 701/1 |
| 7,786,852 B2 * | 8/2010 | Kautz | ................ | B60N 2/2812 340/425.5 |
| 8,284,041 B2 * | 10/2012 | Cuddihy | ................ | B60N 2/002 340/457 |
| 8,493,201 B2 * | 7/2013 | Orbach | .................. | B60N 2/002 180/273 |
| 8,970,362 B2 | 3/2015 | Morley et al. | | |
| 9,302,618 B2 | 4/2016 | Shaw | | |
| 9,403,437 B1 * | 8/2016 | McDonald | ............. | B60K 37/02 |
| 9,522,631 B2 * | 12/2016 | Kleinert | .................... | B60Q 9/00 |
| 9,734,695 B2 * | 8/2017 | Henry | .................... | G08B 21/24 |
| 9,811,995 B2 * | 11/2017 | Gjoni | .................... | G08B 21/24 |
| 10,023,116 B2 * | 7/2018 | Rovinsky | ............... | G08B 21/24 |
| 2002/0171540 A1 | 11/2002 | Ando et al. | | |
| 2003/0222775 A1 * | 12/2003 | Rackham | ............... | B60R 25/1004 340/457 |
| 2005/0057350 A1 * | 3/2005 | Younse | .................. | G08B 21/22 340/457.1 |
| 2009/0224896 A1 * | 9/2009 | Prokhorov | ............ | B60R 25/104 340/426.28 |
| 2010/0315233 A1 * | 12/2010 | Eichenstein | ............ | E05B 45/06 340/542 |
| 2011/0102169 A1 * | 5/2011 | Orbach | .................. | B60N 2/002 340/457 |
| 2012/0050021 A1 * | 3/2012 | Rao | ........................ | B60N 2/002 340/425.5 |
| 2012/0154136 A1 | 6/2012 | Connelly, Jr. | | |
| 2012/0232749 A1 * | 9/2012 | Schoenberg | ........... | B60N 2/002 701/36 |
| 2013/0009766 A1 * | 1/2013 | Shaw | .................... | B60N 2/002 340/457 |
| 2015/0165932 A1 * | 6/2015 | Maley | .................... | B60N 2/002 340/457 |
| 2016/0042616 A1 * | 2/2016 | Dorsey | .................. | G08B 21/22 340/457 |
| 2016/0280067 A1 * | 9/2016 | Cuddihy | ................ | G08B 21/22 |
| 2017/0043714 A1 * | 2/2017 | Lewis-Cheeks | ....... | B60N 2/002 |
| 2017/0182938 A1 * | 6/2017 | Byrd I | ..................... | B60Q 9/00 |

* cited by examiner

SYSTEM AND METHOD FOR DETECTING THE PRESENCE OF NON-SELF-SUFFICIENT OCCUPANTS AT THE BACK SEAT OF VEHICLES

FIELD OF THE INVENTION

The present invention relates to a system and method for detecting the presence of non-self-sufficient passengers at the back seat of vehicles and, more particularly, to detect the presence of children in a vehicle, in particular a baby, by means of an indirect measurement and from probability calculation of a child is inside the car. If the probability is greater than a predetermined limit, a signal is activated preventing the driver leaves the vehicle without checking if there is a child inside it.

BACKGROUND ART

Every year accidents happen in regard to small children, pets and others, forgotten in vehicles. Forgetfulness occurs, among others, due to the driver's routine change, who follows a pattern of actions without remembering the presence of a passenger in the vehicle and, therefore, leaving the vehicle without taking the passenger away.

In order to prevent this kind of accident, several systems have been developed to remind the driver about the presence of occupants. Such systems generally use sensors installed on the vehicle seats, which detect directly the presence of passengers.

Solutions are already known in the art, which involve addition of components to the vehicle, generating increasing cost and the impossibility of application in the entire range of output. These solutions present results using direct measurement, which is performed in the seat by different components/sensors.

Among said known solutions, can be cited those disclosed by the following documents: U.S. Pat. No. 7,701,358 and US 2004/0113797, wherein thermal sensors are attached to the vehicle seats; U.S. Pat. No. 7,123,157, US 2014/0184404, US 2006/0044126 and US 2007/0268119, wherein weight/pressure sensors are attached to the vehicle seats; U.S. Pat. No. 7,325,870 and US 2007/0075575, wherein locking sensors are attached to the fasten seat belt buckle on the back seat of the vehicle; in addition, the documents U.S. Pat. No. 8,643,493 and US 2009/0079557, disclose sensors carried by the driver and/or child on key chains or similar. Other solutions, for the same purpose, are identified in U.S. Pat. Nos. 8,232,874 and 8,063,788 documents, wherein the sensors are coupled directly in the baby carrier basket and the document CN 201828790, discloses sensors which detect the passenger presence by voltage variation. Finally, documents U.S. Pat. No. 8,892,302, US 2008/0088426 and U.S. Pat. No. 8,816,845 which disclose the detection of an occupant presence at the back seat, but no mention is made to the means such detection is performed.

US 2013/0009766 teaches an alarm system for persons or objects forgotten inside a vehicle. However, the proposed system just warms the driver that a previously informed item was forgotten after the system detects the driver left the vehicle.

US 2012/0050021 teaches a person, pet or objects detection system for alerting the driver. The identification of a person, pet or object presence is made by a complex combination of vibration, sound and temperature sensor.

All the above patents are related to monitoring systems performed by direct detection, all of them incurring in implementation costs and changes in the vehicle.

Finally, U.S. Pat. No. 8,493,201 document discloses a system for identifying a casual forgetfulness of an occupant at the back seat of a vehicle, based on both the opening of one of the rear doors and implementation of a button to disable the system, this button provided in the rear part of the passenger compartment. More particularly, the logic for identifying the possible presence of an occupant at the back seat is based on the door opening time relative only to one of the rear doors of the vehicle, while an alarm is activated after the ignition and turning off of the vehicle have been detected. Said alarm continues operating, that is sounding, until a respective rear button, not accessible to the occupants of the front seats of the vehicle, is pressed.

Despite the concept aimed at detecting the rear door opening time is interesting, the implementation of the disclosed system reveals serious operational problems. First, if the driver has placed an object at the back seat and the car dies, the act of restarting said vehicle will cause the alarm activation and therefore the need for the driver to leave his seat, open the rear door and press one of the buttons located on the rear frames of the vehicle. Similarly, if the driver is with his son at the back seat and parks the vehicle in front of the school waiting for picking his another child up, this action also will cause the alarm activation and the need for the driver to leave his seat, open the rear door and press one of the rear buttons in order to turn off the sonorous alarm, probably waking up the child who is inside the vehicle.

OBJECTS OF INVENTION

It is a first object of the present invention to provide a vehicle with an indirect detection system of the presence of passengers, using sensors and components which already exist in the vehicle.

It is a second object of the present invention to provide a low added cost solution, making the safety equipment for occupants popular.

It is a third object of the present invention to provide a low impact solution using components already existing in the vehicle, coordinated by a method that allows them performing the function of detectors.

SUMMARY OF INVENTION

These and other objects are achieved from a system for detecting the presence of non-self-sufficient passengers, or children, at the back seat of vehicles, of the type to be implemented in a vehicle provided with front doors and at least one rear door, said doors being provided with respective sensors able to indicate the condition of open or closed door; an indicative sensor of locked door; and a processing unit comprising at least one processor, at least one memory and I/O connections. The processing unit calculates, by measuring the time the door remains open as well as by the sequence and/or the frequency of opening and closing the doors of the vehicle, the possibility of a non-self-sufficient occupant being present inside the vehicle; and controls the actuation of an alarm in the event of said calculations indicate the possibility of a non-self-sufficient occupant have been forgotten inside the vehicle.

More particularly, said processing unit compares the opening time of a rear door, what is detected by at least one door opening sensor, with a first predetermined time, so as to ascertain the possibility of an occupant has been introduced inside the vehicle; and wherein said possibility of an occupant has been introduced inside the vehicle is stored in the memory. Rather, the processing unit compares the opening time of a rear door, what is detected by at least one door opening sensor, with a second predetermined time, so as to ascertain the possibility that an occupant has been removed from inside the vehicle, when said memory indicate the possibility of an occupant has been previously introduced inside the vehicle.

More particularly, the processing unit detects the possibility of an occupant has been removed/forgotten inside the vehicle after: a sensor detecting the vehicle turning off; and a door locking sensor indicates the locking of the doors. Furthermore, the processing unit determines the possibility of an occupant has been removed/forgotten inside the vehicle after: a sensor detecting the vehicle turning off; and the closed door time is longer than a third predetermined time value, without an indication from the sensor of locked doors.

Furthermore, the alarm system control is performed by the processing unit CPU, which controls: the actuation of a visual alarm; the actuation of an audio alarm; the actuation of a vehicle anti-theft alarm; or a total or partial combination thereof.

Furthermore, the method for detecting the presence of non-self-sufficient occupants, or children, at the back seat of vehicles, comprises the following steps:

A) to detect the opening of a rear door for longer time than the predetermined time T1;
B) to detect the ignition of the vehicle;
C) to detect the vehicle turning off;
D) not to detect the opening of a rear door for longer time than the predetermined time T2;
E) to check the status of the driver's door;
F) to detect the locking of the vehicle; and
G) to actuate the forgotten occupant alarm.

Alternatively, instead of step F), it is performed an F') step which comprises not to detect the locking of doors for a time longer than the predetermined time TMAX.

Furthermore, the method comprises performing a first checking loop until the following conditions are met: opening a rear door for longer time than time T1 and a starting engine to define the possibility of a passenger's presence during the vehicle travel; as well as performing a second checking loop until the following conditions are met: engine off, opening a rear door for a time shorter than time T2, opening the driver's door and locking the doors, to indicate the possibility of an occupant has been forgotten after completing the vehicle travel.

More particularly, the above objects are achieved by a system, which has an algorithm that acts by measuring the time the door remains open as well as the sequence and/or frequency of opening and locking the vehicle doors. It is understood that teenager and adult passengers use a shorter time to accommodate themselves inside the vehicle, because they have not need the preparation required by children passengers (chairs facility for children, baby carrier basket and/or accommodation of little children in such equipment).

When the time the doors remain open is long, the system calculates the probability of the driver being accommodating a little children, animal or load on the vehicle, by measuring time, frequency and/or sequence of opening and closing the doors. This measurement meets the objectives of providing the vehicle with a kind of low-impact detection and cost by using elements previously existing in the vehicle itself.

At the moment the calculated probability is higher than a predetermined limit, the system stores the information that it is possible that the driver is in the vehicle with an occupant.

When the vehicle is parked and turned off, an alert is issued to remind the driver to check whether an occupant is inside the vehicle, in the event the probability, stored during the doors opening at the beginning of the mission, indicates that there is likely to be an occupant on board.

The alert can be a sound, light, actuation of the doors locking, via communication with the driver's cell phone or other forms, depending on available resources in the vehicle in which the technology is applied.

The alert is disabled only by opening the doors in a given time, frequency and sequence and/or actuating a specific button. If the warning is not heeded, the system can preclude the locking of the doors and windows besides generating a new signal.

BRIEF DESCRIPTION OF THE DRAWINGS

The invention will be better understood from the following detailed description of a preferred non-limiting embodiment, illustrated from the accompanying drawings, in which.

DETAILED DESCRIPTION OF THE PREFERRED EMBODIMENTS

Figure 1:
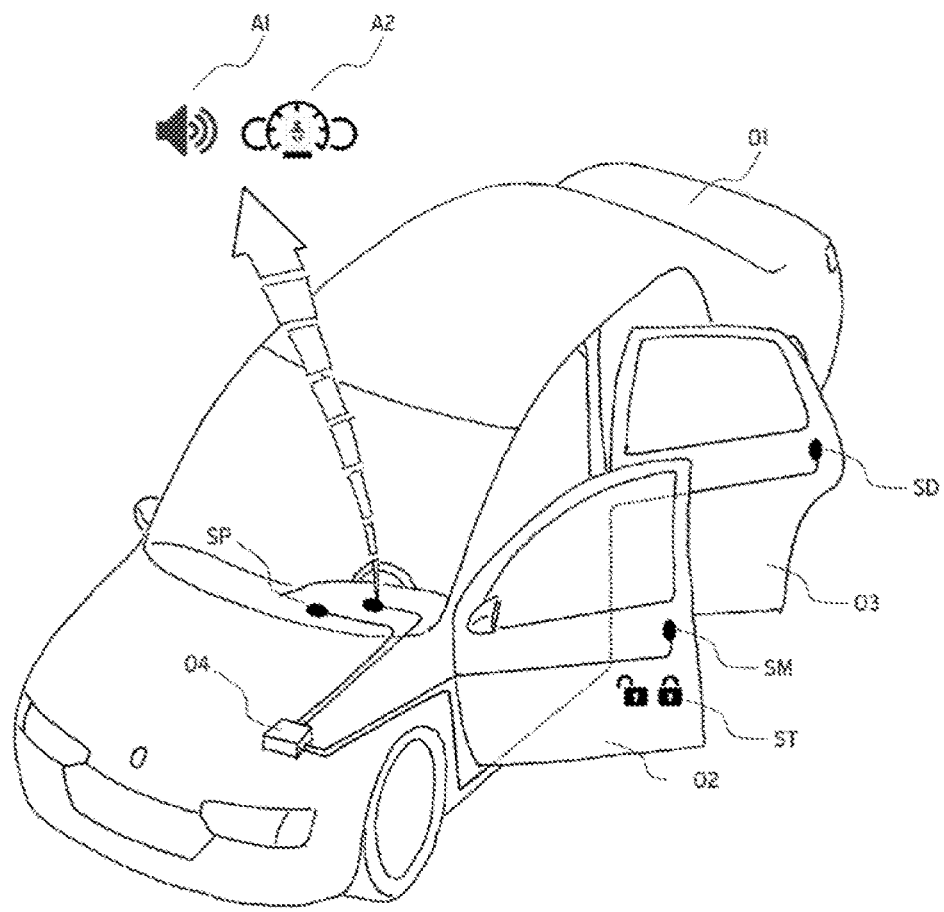
FIG. 1 is a schematic view of a vehicle including the system components of the present invention.

In accordance with the above mentioned FIG. 1, the numerical reference 1 indicates generally a vehicle which comprises at least a front door 2 and at least one rear door 3 in order to access to the passenger compartment. Still in a known manner, each of the rear doors 2, 3 allowing the access to the back seat, has its opening or closing condition indicated by means of a respective sensor $S_D$, $S_T$, also known as door sensor. Usually such $S_D$, $S_T$ sensors are used to turn the vehicle internal lights on but may be employed in other systems, for example, to operate the vehicle theft alarm.

The vehicle 1 further includes a processor 5 which can be a general purpose processor or a processing unit used and programmed so as to carry out predetermined functions. The processor may further be composed of one or more processors, and, in the event of more than one processor, each processor is responsible for performing one or more specific calculations. As used herein, the term "processor" refers to microprocessors, processing units, application specific integrated circuits (ASICs), logic circuits, and/or other circuits or processors able to execute pre-programmed functions. In particular, said processor 5 is integrated in a processing unit 4 of the vehicle (ECU TCU, etc.) and more preferably said processor 5 is integrated to the so-called body computer, usually employed to control and command some internal functions of the vehicle, for example, control panel, information display screen, alarms, door locking, etc.

Said processor is further connected to a memory 7, able to store fixed system parameters (for example, the times T1, T2, and $T_{MAX}$) as well as volatiles data relating to vehicle conditions (opening and locking of each individual door, among others). Said memory 7 or storage resources includes a solid state memory, for example, random access memory (RAM), read only memory (ROM), and/or flash memory), magnetic storage devices (for example a hard disk), optical storage devices and similar.

Figure 2:
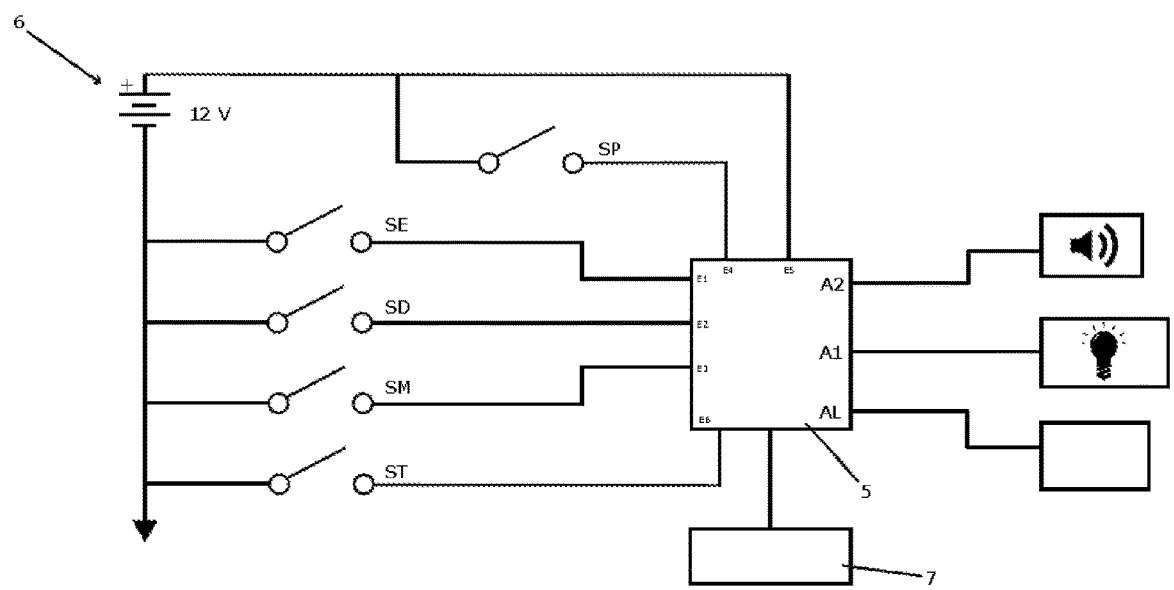
FIG. 2 is a diagram illustrating the main logical connections of the system processing unit of the invention.

Moreover, said processing unit 4 (see FIG. 2) is integrated with other sensor and processing systems of the vehicle 1 by an internal communication network (not shown), in the form of a CAN network, Ethernet or like. Alternatively, said sensors SD, SE can be connected to said processing unit 4 by a specific wiring harness.

The processing unit 4 also receives an indication about the locking or unlocking of the doors 2, 3 of the vehicle 1. In modern vehicles, this information can be available in the body computer itself. In vehicles with lower computational increment, the control of locking the doors is made by means of a simple electromechanical assembly (actuator button, relay and solenoid driver). Anyway, a sensor ST indicates if the doors 2, 3 of the vehicle are locked.

Moreover, said processing unit 4 is powered directly by the battery 6 of the vehicle, in a direct way, in order the processing unit can act before the driver activates the vehicle 1 systems by the starter drive (key on position). On the other hand, a starting sensor $S_P$ allows the system to identify when the driver starts the vehicle, that is, the key is moved from the position "key on" to the position "ignition". Such starting sensor $S_P$ can be implemented as a proper sensor such as a sensor indicative of the angular position of the vehicle ignition key, and it can also be an indirect sensor, for example, as an engine RPM sensor, indicating a rotational speed different from zero.

Finally, the processing unit 4 is connected to at least one output responsible for warning the driver about the presence of a child in the vehicle. Said output may thus comprise: an audio connection A2 with the horn of the vehicle; a visual connection A1 with the screen information display on the dashboard, or a spy light or similar also arranged on the dashboard; or a connection AL with the anti-theft alarm system of the vehicle, which can actuate simultaneously or alternately, headlights, turn signals, a sounder other than the horn, as well as to send a message to the driver's cell phone if the vehicle or its alarm system are provided with such communication system. Similarly, and in the event the vehicle is equipped with a remote tracking system, this can be actuated and inform the driver that such situation was detected.

Figure 3:
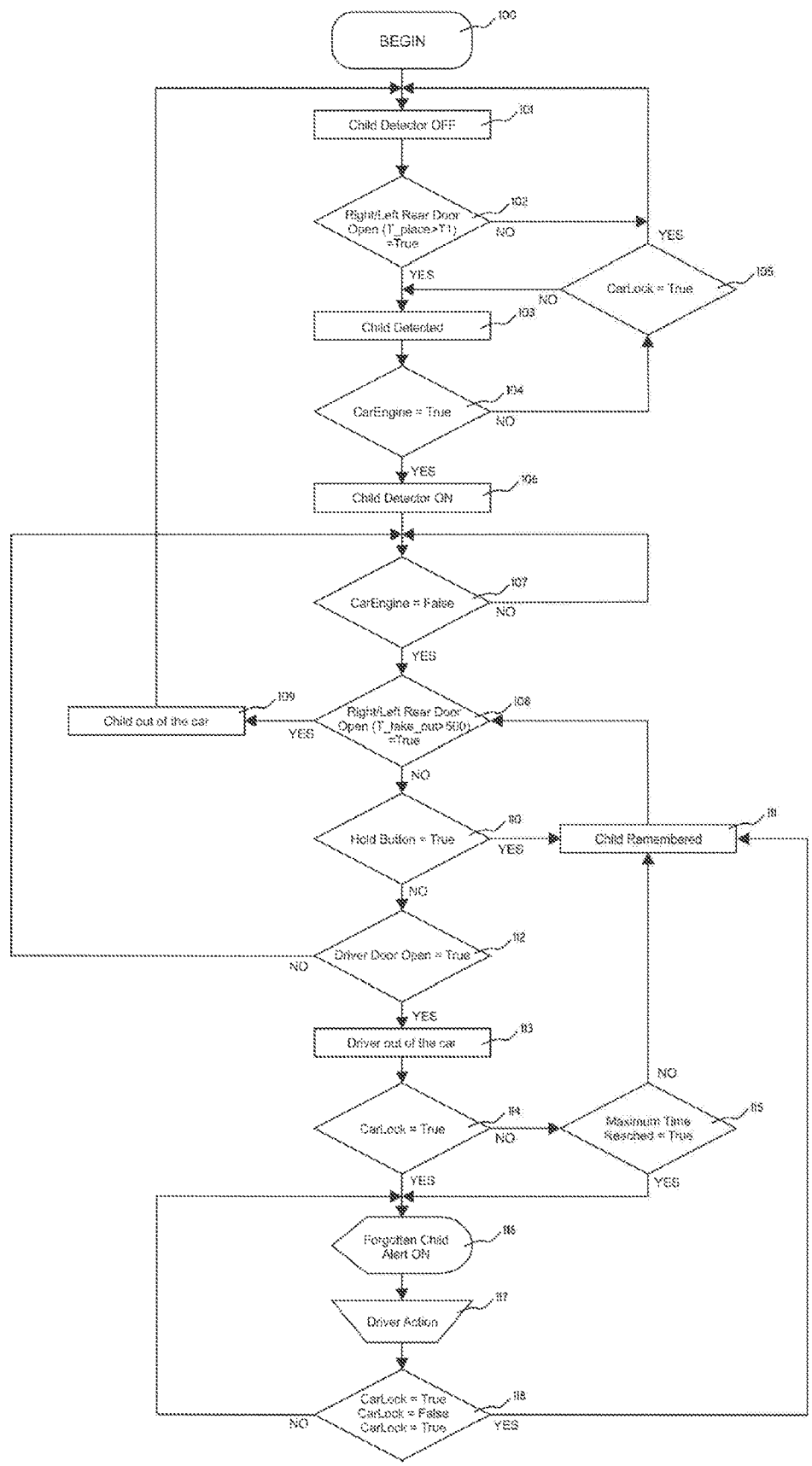
FIG. 3 illustrates a flowchart related to the method steps of the invention.

FIG. 3 illustrates, in the form of a flowchart, the steps of a particularly effective embodiment of the method of the present invention for detecting the likelihood of forgetting an occupant inside the vehicle, by means of time detection as well as by means of the frequency and/or sequence of opening the door 2, 3.

The system starts in block 100 and in block 101 is predetermined the non-presence of an occupant. In this step there are no variables or readings stored in memory 7 but only the pre-predetermined system parameters. In block 102, it is detected the opening of a rear door by one of the sensors $S_D$ or $S_E$, wherein the system is enabled and, primarily, starts the time counting of the opening of said rear door 3. Thus, in the event the door opening time is shorter than a previously stored time T1, the system will assumes that there was insufficient time for an occupant has been placed on the vehicle back seat, whereby it remains in the waiting condition. In the opposite case, i.e. if the time of the door in the open condition is longer than time T1, the system assumes that an occupant may have been introduced into the vehicle. Thus, in block 103, the system stores an indication of the presence of an occupant ("occupant detected") therein.

In block 104, then, the system checks whether the vehicle is turned on. If not, it is assumed that the vehicle may have just been opened for removal or introduction of an object, i.e., an operation not bound to the vehicle movement. Thus, the block 105 confirms that the vehicle has been locked again, then returning to the initial condition of the block 101. In the case of starting the vehicle engine, the system assumes the condition of a vehicle in movement with one occupant, preferably a child at the back seat (block 106) and remains checking (in loop) the time the vehicle is turned off (block 107).

When the vehicle is turned off, the system assumes the end of the travel and then starts to detect and count the opening time of at least one of the vehicle rear doors 3, for a time longer than time T2. In the event a rear door 3 remains open for a time longer than time T2, it is understood that the occupant was removed (block 109) and the system return to its initial condition. In the case of the door opening time be regarded as insufficient to remove the occupant, the driver can command (block 110), via a button or touching the vehicle display, indicating awareness of the presence of an occupant to his care (block 111). The system then waits the driver to go out the car (block 112) by opening his door, thus indicating the intention to leave the vehicle permanently. In the event, in block 112, the opening of the driver's door is not detected, the system remains in closed loop (blocks 107, 108, 110 and 112), constantly checking the conditions of occupant not removed (via opening time of a rear door) and the driver's leaving the vehicle by opening the driver's door.

More particularly, it is worth noting that the door opening times T1 and T2 can be equal to each other, however, preferably are different. This takes into account that the introduction and removal procedures of the vehicle occupant are different. For example, the accommodation of a little child in baby carrier basket or its removal are laborious steps, but with specific and particular characteristics. In addition, if it is necessary the installation and fixing the baby carrier basket in the vehicle is more complex procedure than the removal one. Anyway, the times T1 and T2 are only empirical and not interrelated.

Finally, if these conditions are met, in block 113 the system identifies that the driver has left the vehicle, but without occurring the removal of the occupant, with subsequent locking of the vehicle doors (block 114), indicating that the driver parked the vehicle definitely. In this situation, the system actuates alerts to the driver by means of one of the audio A2, visual A1 connections or by alarm AL so as to indicate to the driver that he has forgotten the occupant inside the vehicle. As already mentioned, other means can be used, in combination, to indicate the driver oblivion, such as sending a signal to a smart key chain or by sending a message to the cell or to the monitoring and tracking vehicle central.

On the other hand, if does not occurs the locking of the vehicle doors, in block 115 begins a time counting, in relation to a time TMAX, from which the system assumes that the driver may have forgotten the occupant as well as he may have forgotten to lock the vehicle. In this situation, it is also actuated the alert of block 116.

Lastly and in order the system is disabled, a positive action is required by the user (block 117), e.g., locking, unlocking and locking the vehicle again, i.e., an action indicative of a conscious action and not merely mechanical conscious action from the user.

As a result of the sequence shown above, it can be defined the steps provided by the method of the present invention. These are the steps:

A) to detect the opening of a rear door for longer time than the predetermined time T1;

B) to detect the ignition of the vehicle;

C) to detect the vehicle turning off;

D) not to detect the opening of a rear door for longer time than the predetermined time T2;

E) to check the status of the driver's door;

F) to detect the locking of the vehicle; and

G) to actuate the forgotten child alarm.

More particularly, considering the vehicle is in a parked condition, that is, with the doors closed and the engine off, the Step A) seeks to determine if one of the rear doors 3 remains open for longer time than a predetermined time T1. The time T1 is empirical and takes into account the fact that the accommodation of a little child in the "seat" takes considerably more time than the boarding of a young or an adult person.

In step B), the act of starting the vehicle is assumed as driving the vehicle 1 with a child passenger inside of it, this driving ending with the vehicle turned off in step C). At this point, it is awaited that one of the rear doors is opened and remains so for a time longer than time T2 in order to allow the removal of the child from the back seat. In the event this situation is not checked (step D), it is assumed that the occupant will remain in the vehicle while the driver left thereof (step E)).

In the F) step, the detection of vehicle doors locking indicates that the driver has parked the vehicle and intends to leave it parked. However, as the removal of the child (step D) has not been identified, the forgotten child alarm is actuated in step G), thereby alerting the driver.

Alternatively, the driver can also forget to lock the vehicle. In this case, in the step F) is awaited that the vehicle is locked during a time period TMAX, or that the vehicle condition is changed (for example, the vehicle ignition). In the event of no action is detected (in particular the locking of the vehicle), is assumed a double driver's oblivion, which also leads to the actuation of an alarm in step G). On the other hand, if the engine is turned on, the front door 2 is opened or a similar action occurs, it is assumed that the vehicle was temporarily stopped for an immediate action, thus not compromising the integrity of the child occupant.

In regard to the temporal parameters (T1, T2 and TMAX), which are part of the system herein proposed, the inventors conducted some field tests in order to determine experimental minimum values for the respective conditions could be regarded as satisfied. Thus, the time T1 for placing an occupant inside the vehicle can be predetermined as 3 seconds or longer. In regard to the removal time T2 of an occupant can be determined as 4 seconds or longer. More particularly, the time T1 is preferably predetermined as being between 3 and 6 seconds, while the time T2 is preferably defined as being between 4 and 7 seconds.

Finally, the time TMAX, which can be defined as the potential time the driver is keeping out from the vehicle, or waiting time, or security for the alarm actuation, can be predetermined as 10 seconds or longer, and further, particularly preferably, predetermined as being between 10 and 20 seconds.

The great advantage of the method of the present invention is its implementation without the need of installing any new hardware, device or sensor in the vehicle. The method can be easily converted into routine, such as the above described routine, by way of illustration and not limitation, and implemented in one of various processing units 4 of the vehicle (ECU TCU, etc.) and more preferably in the so-called body computer.

What we claim is:

1. System for detecting a presence of non-self-sufficient occupants or children at a back seat of a vehicle, such of that implemented in a vehicle having front doors and at least one rear door, said doors being provided with respective sensors ($S_M$, $S_D$, $S_E$) with capability to indicate the condition of door open and door closed; one indicative sensor (ST) of locked door, a starting sensor (Sp); and a processing unit comprising at least one processor, at least one memory and connections I/O, said system being characterized by said processing unit being configured to calculate: by measuring a first time a door remains open, and based on said first time the door remains open as well as by a sequence and/or a frequency of opening and closing the doors of the vehicle, a possibility of a non-self-sufficient occupant have been introduced inside the vehicle when said first time is greater than a predetermined time (T1), wherein the time (T1) is greater than 3 seconds; by measuring a second time the door remains open, and based on said second time the door remains open as well as by a sequence and/or a frequency of opening and closing the doors of the vehicle, a possibility of a non-self-sufficient occupant have been forgotten inside the vehicle when said second time is greater than a predetermined time (T2), wherein the time (T2) is greater than 4 seconds; and activating an alarm (A1, A2, AL) when said calculation indicates the possibility of a non-self-sufficient occupant have been forgotten inside the vehicle, wherein the alarm is activated by detecting the locking of the vehicle during a third time ($T_{MAX}$) wherein the third time ($T_{MAX}$) is longer than 10 seconds.

2. System according to claim 1, wherein the processing unit is configured to compare an opening first time of a rear door, detected by at least one door opening sensor ($S_O$, $S_E$), with a predetermined time (T1), so as to determine the possibility of an occupant has been introduced inside the vehicle; and wherein said possibility of an occupant has been introduced inside the vehicle is stored in said at least one memory.

3. System according to claim 1, wherein the processing unit is configured to compare the opening second time of a rear door, detected by at least one door opening sensor ($S_O$; $S_E$), with a predetermined time (T2) so as to determine the possibility of an occupant has been removed from the vehicle when said at least one memory indicates the possibility of an occupant has been previously introduced inside the vehicle.

4. System according to claim 3, wherein the processing unit is configured to detect the possibility of an occupant has been removed/forgotten inside the vehicle after:

the starting sensor ($S_P$) has detected the shutdown of the vehicle;

one of said respective sensors ($S_M$) of said doors has detected the opening of the driver's door; and the indicative sensor ($S_T$) has indicated the doors locked.

5. System according to claim 3, wherein the processing unit is configured to detect the possibility of an occupant has been removed/forgotten inside the vehicle after:

the starting sensor ($S_P$) has detected the vehicle turned off;

one of said respective sensors ($S_M$) of said doors has detected the opening of the driver's door; and the closed door time is longer than a predetermined time ($T_{MAX}$), without an indication of locked doors by the indicative sensor ($S_T$).

6. System according to claim 1, wherein to control the actuation of an alarm means that the processor of the processing unit is configured to control:

the activation of a visual alarm (A1);

the activation of an audio alarm (A2);

the activation of a vehicle anti-theft alarm (AL); or total or partial combination of alarms (A1, A2, AL).

7. System according to claim 1, wherein the time (T1) is between 3 and 6 seconds; the time (T2) is between 4 and 7 seconds; and the predetermined time ($T_{MAX}$) is between 10 and 20 seconds.

8. System according to claim 1, wherein the processor of the processing unit is configured to receive, as inputs, signals from at least sensors ($S_P$, $S_E$, $S_D$ $S_M$ $S_T$) and sends, as outputs, control signals to at least one of the alarms (A1, A2, AL), and store temporary data and configuration parameters in at least one memory.

9. Vehicle comprising a system for detecting a presence of non-self-sufficient occupants at a back seat of a vehicle, according to claim 1.

10. Method for detecting a presence of non-self-sufficient occupants or children at a back seat of a vehicle having a rear door, a driver's door, an engine, a lock, and an alarm, characterized by the fact that it comprises comprising the steps of:
- A) detecting an opening of a rear door for a longer time than a predetermined time T1 wherein the time T1 is longer than 3 seconds;
- B) detecting an ignition of the engine of the vehicle;
- C) detecting a turning off of the engine of the vehicle;
- D) detecting an opening of a driver's door;
- E) detecting that a rear door has not been opened for a longer time than a predetermined time T2 wherein the time T2 is longer than 4 seconds;
- F) detecting a locking of the vehicle during a time TMAX, wherein the time TMAX is longer than 10 seconds; and
- G) actuating a forgotten occupant alarm based on the detection of steps A through F.

11. Method according to claim 10, wherein it comprises a step F'), instead of step F), wherein said step F') comprises: detecting a door has not been locked for a time longer than a predetermined time $T_{MAX}$.

12. Method according to claim 11, wherein the time T1 is between 3 and 6 seconds; the time T2 is between 4 and 7 seconds; and the time $T_{MAX}$ is between 10 and 20 seconds.

13. Method according to claim 10, wherein the times T1, T2 and $T_{MAX}$ are different to each other.

14. Method, according to claim 10, wherein it performs a first cycle of steps until opening of one rear door for a time longer than time T1, and engine running to define a possibility of the presence of an occupant during the vehicle travel.

15. Method according to claim 10, wherein it performs a second cycle of steps until engine off, opening of a rear door for a shorter time than time T2 and the opening of driver's door in order to indicate a possibility of an occupant has been forgotten after completion of vehicle travel.

16. Vehicle comprising a processor for carrying out a method to detect a presence of non-self-sufficient occupants at a back seat of a vehicle, according claim 10.

* * * * *